United States Patent Office 2,874,138
Patented Feb. 17, 1959

2,874,138

LOWER FATTY ACID ESTERS OF N,N,N',N' TETRAKIS (2-HYDROXYPROPYL)ETHYLENE DIAMINE AND VINYL CHLORIDE COMPOSITIONS CONTAINING SAME

Donald R. Jackson, Wyandotte, Mich., assignor to Wyandotte Chemicals Corporation, Wyandotte, Mich., a corporation of Michigan No Drawing. Application November 28, 1955
Serial No. 549,512

4 Claims. (Cl. 260—31.8)

This invention relates to lower fatty acid esters of N,N,N',N' tetrakis(2-hydroxypropyl)ethylene diamine. These compounds are high boiling point esters which are excellent plasticizers for polyvinylchloride and many other resins.

By definition a plasticizer is a compound which keeps a resinous substance soft and viscous and which prevents the cracking of films thereof. However, it has been a problem of long standing to find plasticizers which will withstand elevated temperatures such as are encountered when dealing with synthetic resins and the like, without decomposing, oxidizing, or polymerizing and thereby adversely affecting their plasticizing action. Likewise, it has been a problem of long standing to find a plasticizer having a fairly high boiling point in comparison to the melting points of synthetic resins and the like and also a melting point well below room temperature. Consequently, a plasticizer characterized by thermal stability, high boiling point and low melting point represents a marked advance in the art.

It is a general object of this invention to provide a plasticizer which has the properties of thermal stability, high boiling point, and low melting point.

A specific object of this invention is to prepare such a plasticizer from N,N,N',N' tetrakis(2-hydroxypropyl)-ethylene diamine (sometimes hereinafter referred to as THPED).

Still another object of this invention is to produce plasticized resins with a plasticizer having the properties of thermal stability, high boiling point, and low melting point.

These and other objects which may develop as this specification proceeds are achieved by this invention which, in summary, comprises the lower fatty acid esters of N,N,N',N' tetrakis(2-hydroxypropyl)ethylene diamine (THPED), the preparation of the same, and plasticized resins containing said esters as plasticizers.

The esters of this invention are prepared from THPED and lower fatty acids (fatty acids containing not more than 7 carbon atoms in their structure). These esters conform in general to the following structural formula:

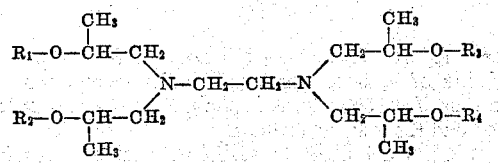

wherein $R_1$, $R_2$, $R_3$ and $R_4$ are selected from the group consisting of hydrogen and acyl radicals containing not more than 7 carbon atoms in their structure, at least one of said R's being an acyl radical. Typical of the esters coming within the scope of the present invention are the following:

Monoformate ester of N,N,N',N' tetrakis(2-hydroxypropyl)ethylene diamine
Monoacetate ester of N,N,N',N' tetrakis(2-hydroxypropyl)ethylene diamine
Monovalerate ester of N,N,N',N' tetrakis(2-hydroxypropyl)ethylene diamine
Monohexanoate ester of N,N,N',N' tetrakis(2-hydroxypropyl)ethylene diamine
Monoheptanoate ester of N,N,N',N' tetrakis(2-hydroxypropyl)ethylene diamine
N,N' diformate ester of N,N,N',N' tetrakis(2-hydroxypropyl)ethylene diamine
N,N dipropionate ester of N,N,N',N' tetrakis(2-hydroxypropyl)ethylene diamine
N acetate, N' butyrate ester of N,N,N'N', tetrakis(2-hydroxypropyl)ethylene diamine
N,N,N' triacetate ester of N,N,N',N' tetrakis(2-hydroxypropyl)ethylene diamine
N,N,N' tripropionate ester of N,N,N',N' tetrakis(2-hydroxypropyl)ethylene diamine
Tetra formate ester of N,N,N',N' tetrakis(2-hydroxypropyl)ethylene diamine
Tetra acetate ester of N,N,N',N' tetrakis(2-hydroxypropyl)ethylene diamine
Tetra propionate ester of N,N,N',N' tetrakis(2-hydroxypropyl)ethylene diamine
Tetra butyrate ester of N,N,N',N' tetrakis(2-hydroxypropyl)ethylene diamine
Tetra isobutyrate ester of N,N,N'N', tetrakis(2-hydroxypropyl)ethylene diamine
Tetra valerate ester of N,N,N',N' tetrakis(2-hydroxypropyl)ethylene diamine
Tetra hexanoate ester of N,N,N',N' tetrakis(2-hydroxypropyl)ethylene diamine
Tetra heptanoate ester of N,N,N',N' tetrakis(2-hydroxypropyl)ethylene diamine The compounds of this invention are also prepared, for example, by heating N,N,N',N' tetrakis(2-hydroxypropyl)ethylene diamine with a lower fatty acid in the form of an acid anhydride or of an acid chloride. However, the acid anhydride is preferred over the acid chloride because it is more economical and because no hydrochloric acid is formed in the reaction. Hydrochloric acid not only tends to corrode equipment but also tends to make isolation of the final product more difficult because of the holding power of the tertiary nitrogen groups in the final product on the hydrochloric acid.

Preferably, the reaction is carried out in a distillable inert liquid medium and upon completion of the reaction, the liquid medium and unreacted raw materials are preferably removed by distillation. To purify the crude product, the residual acid may be neutralized with a strong inorganic base. The product is then washed with water, dried, and distilled, whereby the product is obtained in a remarkably high yield.

The esters of this invention may also be prepared by an ester exchange procedure. This procedure is of advantage when it is desired that at least one of said R's in the structural formula set forth in a preceding paragraph should have a high number of carbon atoms. In brief, the ester exchange procedure involves cooking THPED with an ester of an alcohol having a lower boiling point than that of THPED (which is 190° C. at 1 mm. pressure), the acyl radical of said ester containing the number of carbon atoms desired in at least one acyl radical of the final product. For an economical yield the cooking is preferably carried out in the presence of the sodium salt of the fatty acid from which the ester is derived. During the cooking, the hydrogen atom of at least one hydroxyl group of THPED and the acyl radical exchange places whereby THPED is esterified and an alcohol is formed which boils away. The product can be purified by distillation.

In all of the reactions here disclosed the mole ratio of a reactant to THPED will depend largely on the degree of esterification desired, with that reactant, keeping in mind that THPED has four reactive hydrogens. However, because in each reaction equilibrium conditions are involved, it is preferred to use a ratio of less than 1 to obtain the mono-ester and to use a ratio greater than 4 to 1 to obtain the tetra ester. To obtain the di-ester and tri-ester, mole ratios of at least 2 and 3, respectively, may be used. Isolation of a particular ester, especially in the latter two instances may be accomplished by conventional washing and distillation procedures although for most uses this may not be necessary; in other words, mixtures of esters will be permissible for most uses and especially will be permissible for use as plasticizers. The same also applies in using two or more reactants differing in the number of their carbon atoms.

To plasticize plasticizable resins, an ester of this invention is mixed with the resin, the mixture is heated until a homogeneous liquid dispersion is formed and then the dispersion thus formed is cooled.

To illustrate the practice and the principle of this invention to those skilled in the art the following examples are set forth, although it is to be understood that the invention is not to be unduly limited thereby.

The preparation of the esters of this invention is illustrated by the following example.

*Example 1*

A total of 219 grams (0.75 mol) of N,N,N',N' tetrakis(2-hydroxypropyl)ethylene diamine (prepared by the method of U. S. 2,697,118) and 200 ml. of benzene were charged into a 3-neck round bottom flask equipped with a stirrer, dropping funnel and reflux condenser. Acetic anhydride in the amount of 459 grams (4.5 mols) was added drop-wise to the mixture with stirring and the reaction temperature was kept at 45°–60° C. by the occasional use of external cooling. After the addition of the acetic anhydride was completed, the reaction mixture was heated for 4 hours at 95°–100° C. to complete the reaction. Benzene, acetic acid and acetic anhydride were removed by distillation and the ester remaining in the distillation pot was washed once with 4% NaOH solution and twice with water. The ester was taken up in 200 ml. of benzene and dried by azeotropic distillation. After the benzene was distilled away under reduced pressure, the tetra acetate of N,N,N',N' tetrakis(2-hydroxypropyl)-ethylene diamine was distilled over at 178°–179° C. at 0.3 mm. of Hg without any evidence of decomposition or polymerization. The product was, at room temperature, a very pale, straw-colored, viscous oil and was obtained in a 90% yield.

The esters of the present invention are excellent plasticizers for polyvinylchloride, polystyrene, cellulose acetate-butyrate, ethylcellulose and numerous other resins. The plasticizing action of these esters is exemplified by Examples 2, 3, 4 and 5, in which the tetra acetate of N,N,N',N' tetrakis(2-hydroxypropyl)ethylene diamine is used as the plasticizer. The same action with comparable results is obtainable in using the other lower fatty acid esters of this invention as plasticizers for these resins.

*Example 2*

Ten grams of polyvinylchloride (Geon 101, B. F. Goodrich Company) and 40 grams of the tetra acetate of N,N,N',N' tetrakis(2-hydroxypropyl)ethylene diamine were stirred in a beaker to form a creamy paste. The mixture was then heated for 0.5 hour at 160° C. to form a homogeneous liquid dispersion which on cooling gave a dry, translucent, flexible plasticized resin.

*Example 3*

Ten grams of cellulose acetate-butyrate (type AB381-1, Tennessee Eastman Company) and 20 grams of the tetra acetate of N,N,N',N' tetrakis(2-hydroxypropyl)ethylene diamine were heated together at 160° C. whereby a homogeneous liquid dispersion was formed which upon cooling and casting a translucent, flexible, rubbery plasticized resin was obtained.

*Example 4*

Example 3 was repeated except that ethyl cellulose (type N-7, Hercules Powder Company) was substituted for the cellulose acetate-butyrate. As in Example 3, a flexible, rubber-like plasticized resin was obtained.

*Example 5*

Eight grams of polystyrene (Piccolastic D–100, Pennslvania Industrial Chemical Company) and 2 grams of the tetra acetate ester of N,N,N',N' tetrakis(2-hydroxypropyl)-ethylene diamine were heated together at 130° C. to form a homogeneous melt and a thin flexible film of polystyrene was cast therefrom.

An outstanding characteristic of the esters of the present invention is their remarkable thermal stability. Note in Example 1 that the tetra acetate ester of N,N,N',N' tetrakis(2-hydroxypropyl)ethylene diamine distilled over without any evidence of thermal decomposition. This property of the esters of this invention appears to be unusual indeed because the lower fatty acid esters of the analogous compound N,N,N',N' tetrakis(2-hydroxyethyl)ethylene diamine are reported to decompose when heated and to be undistillable. In this regard see U. S. Patent No. 2,697,118, column 3, lines 2–6.

This property is of prime importance because not only does it enable the esters of this invention to be purified by distillation, but it also permits them to be used under conditions of elevated temperatures such as are encountered in plasticizing operations.

Moreover, it will be noted that the esters of this invention have a high boiling point and a low melting point.

What is claimed is:

1. Lower fatty acid esters of N,N,N',N' tetrakis(2-hydroxypropyl)ethylene diamine conforming to the formula:

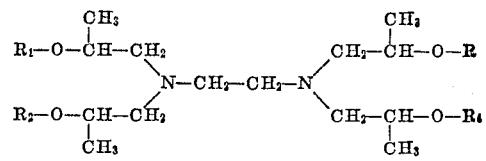

wherein $R_1$, $R_2$, $R_3$ and $R_4$ are selected from the group consisting of hydrogen and acyl radicals containing not more than 7 carbon atoms in their structure and at least one of said R's is an acyl radical.

2. The tetra acetate of N,N,N',N' tetrakis(2-hydroxypropyl)ethylene diamine.

3. A polyvinyl chloride resin composition comprising polyvinyl chloride resin and a lower fatty acid ester of N,N,N',N' tetrakis(2-hydroxypropyl)ethylene diamine conforming to the formula:

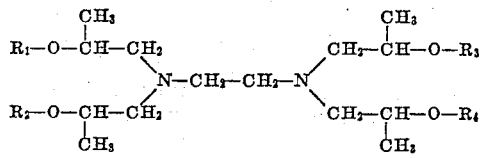

wherein $R_1$, $R_2$, $R_3$ and $R_4$ are selected from the group consisting of hydrogen and acyl radicals containing not more than 7 carbon atoms in their structure and at least one of said R's is an acyl radical.

4. A polyvinyl chloride resin composition according to claim 3 wherein said ester is the tetra acetate of N,N,N',N' tetrakis(2-hydroxypropyl)ethylene diamine.

References Cited in the file of this patent

UNITED STATES PATENTS 2,697,118    Lundsted et al.    Dec. 14, 1954

FOREIGN PATENTS 635,011    Great Britain    Mar. 29, 1950